(12) United States Patent
Hobbs et al.

(10) Patent No.: US 7,401,049 B2
(45) Date of Patent: Jul. 15, 2008

(54) SYSTEM AND METHOD FOR A PREPAID CARD ISSUED BY A FOREIGN FINANCIAL INSTITUTION

(75) Inventors: Chris Hobbs, Valley Park (SG); Grace Park, New York, NY (US); Tomer Rubinshtein, New York, NY (US)

(73) Assignee: American Express Travel Related Services Company, Inc., New York, NY (US)

( * ) Notice: Subject to any disclaimer, the term of this patent is extended or adjusted under 35 U.S.C. 154(b) by 750 days.

(21) Appl. No.: 10/155,332

(22) Filed: May 23, 2002

(65) Prior Publication Data

US 2002/0194124 A1 Dec. 19, 2002

Related U.S. Application Data

(60) Provisional application No. 60/294,107, filed on May 29, 2001.

(51) Int. Cl.
*G06Q 40/00* (2006.01)

(52) U.S. Cl. ............ 705/39; 35/43; 35/65; 35/66; 707/10; 235/380; 379/88.25; 379/91; 379/114.2

(58) Field of Classification Search .......... 705/66, 705/43, 65, 35, 39; 707/10; 235/380; 379/88.25, 379/91, 114.2
See application file for complete search history.

(56) References Cited

U.S. PATENT DOCUMENTS

| | | | |
|---|---|---|---|
| 4,766,296 A * | 8/1988 | Barth | 235/383 |
| 4,837,422 A | 6/1989 | Dethloff et al. | |
| 4,968,873 A | 11/1990 | Dethloff et al. | |
| 5,025,372 A | 6/1991 | Burton et al. | |
| 5,046,157 A | 9/1991 | Smith et al. | |
| 5,136,633 A * | 8/1992 | Tejada et al. | 379/91.02 |
| 5,177,342 A | 1/1993 | Adams | |
| 5,287,269 A | 2/1994 | Dorrough et al. | |
| 5,321,241 A | 6/1994 | Craine | |
| 5,350,906 A | 9/1994 | Brody et al. | |
| 5,485,510 A | 1/1996 | Colbert | |
| 5,500,513 A | 3/1996 | Langhans et al. | |
| 5,621,201 A | 4/1997 | Langhans et al. | |
| 5,631,947 A | 5/1997 | Wittstein et al. | |

(Continued)

*Primary Examiner*—Harish T Dass
(74) *Attorney, Agent, or Firm*—Snell & Wilmer L.L.P.

(57) ABSTRACT

A system and method for providing a reloadable prepaid card account maintained by a foreign financial institution is provided. The foreign financial institution is provided with a domestic payment network authorization code, such as the bank identification number approved by the American Banking Association. The BIN along with a prepaid account number is loaded onto a prepaid card corresponding to the prepaid account. A prepaid cardholder may present the prepaid card to a merchant system for completion of a transaction request. The merchant system may be accessed domestically and may recognize the BIN as belonging to the foreign financial institution authorized to transact business on the merchant's domestic payment network. The merchant may seek satisfaction of the transaction request by submitting the transaction request to an acquirer which may forward the transaction request to the foreign financial institution for processing. The foreign financial institution may provide funds to the merchant system to satisfy the transaction request, and the provided funds may be converted to the currency of the country in which the merchant system is accessed by the prepaid cardholder.

31 Claims, 2 Drawing Sheets

U.S. PATENT DOCUMENTS

| | | |
|---|---|---|
| 5,708,422 A | 1/1998 | Blonder et al. |
| 5,845,260 A | 12/1998 | Nakano et al. |
| 5,878,134 A | 3/1999 | Handelman et al. |
| 5,878,337 A | 3/1999 | Joao et al. |
| 5,884,274 A | 3/1999 | Walker et al. |
| 5,893,907 A * | 4/1999 | Ukuda .................. 705/35 |
| 5,907,831 A | 5/1999 | Lotvin et al. |
| 5,914,472 A | 6/1999 | Foladare et al. |
| 5,953,710 A | 9/1999 | Fleming |
| 5,991,750 A | 11/1999 | Watson |
| 5,999,596 A | 12/1999 | Walker et al. |
| 6,021,943 A | 2/2000 | Chastain |
| 6,023,682 A | 2/2000 | Checchio |
| 6,032,134 A | 2/2000 | Weissman |
| 6,044,360 A | 3/2000 | Picciallo |
| 6,047,270 A | 4/2000 | Joao et al. |
| 6,064,986 A | 5/2000 | Edelman |
| 6,128,602 A | 10/2000 | Northington et al. |
| 6,173,269 B1 | 1/2001 | Solokl et al. |
| 6,182,895 B1 | 2/2001 | Albrecht |
| RE37,122 E * | 4/2001 | Levine et al. ............. 235/380 |
| 6,226,364 B1 | 5/2001 | O'Neil |
| 6,226,624 B1 | 5/2001 | Watson et al. |
| 6,267,292 B1 | 7/2001 | Walker et al. |
| 6,327,348 B1 | 12/2001 | Walker et al. |
| 6,422,462 B1 | 7/2002 | Cohen |
| 6,505,772 B1 | 1/2003 | Mollett et al. |
| 6,529,725 B1 | 3/2003 | Joao et al. |
| 6,697,806 B1 * | 2/2004 | Cook ..................... 707/10 |
| 6,793,135 B1 * | 9/2004 | Ryoo ..................... 235/383 |
| 2001/0047336 A1 | 11/2001 | Maycock, Jr. et al. |
| 2001/0051917 A1 | 12/2001 | Bissonette et al. |
| 2002/0025797 A1 | 2/2002 | Joao et al. |
| 2002/0095386 A1 | 7/2002 | Maritzen et al. |
| 2002/0099365 A1 | 7/2002 | Guiragosian |
| 2002/0123938 A1 | 9/2002 | Yu et al. |
| 2002/0152158 A1 | 10/2002 | Paleoiv et al. |
| 2002/0165777 A1 | 11/2002 | Lotvin et al. |
| 2002/0174016 A1 | 11/2002 | Cuervo |
| 2002/0194079 A1 | 12/2002 | Kimble |
| 2002/0198806 A1 | 12/2002 | Blagg et al. |
| 2003/0028481 A1 | 2/2003 | Flitcroft et al. |
| 2003/0053609 A1 * | 3/2003 | Risafi et al. ............. 379/114.2 |
| 2003/0055786 A1 | 3/2003 | Smith, Jr. et al. |

* cited by examiner

SYSTEM AND METHOD FOR A PREPAID CARD ISSUED BY A FOREIGN FINANCIAL INSTITUTION

RELATED APPLICATIONS

This patent application claims priority to, and the benefit of, the U.S. provisional patent application U.S. Ser. No. 60/294,107, entitled "SYSTEM AND METHOD FOR A PREPAID CARD ISSUED BY A FOREIGN FINANCIAL INSTITUTION" filed on May 29, 2001, which is hereby incorporated by reference.

FIELD OF INVENTION

The present invention generally relates to prepaid card systems, and more specifically, to a system and method for enabling domestic use of a prepaid card issued by a foreign financial institution.

BACKGROUND OF THE INVENTION

In recent years, economic globalization has led to an increased number of international business travelers. To conduct business, these business travelers typically must remain in a country of a different origin and/or monetary base than from where the business traveler originated. In some cases, it may be necessary for the business traveler to remain in the foreign country for an extended period of time in order to complete his intended business.

To subsist in the foreign country for any extended period of time, the business traveler often must be able to pay for living or business expenses. In that regard, an employer may provide the business traveler with various different means for paying for the expenses. For example, the business traveler may be given cash which can be issued in the currency of the traveler's country of origin (e.g. local currency) or in the currency of the country of the traveler's intended destination (e.g. foreign currency). However, carrying cash has several disadvantages. For example, the cash typically must be converted to the currency of the country of intended travel using international currency conversion rates. Further, the traveler typically must keep track of expenses incurred during his business trip for reimbursement and accounting purposes. Further still, cash is often irreplaceable if lost or stolen, leaving the business traveler without sufficient funds to sustain his trip.

In spite of the disadvantages of carrying cash, some business travelers may still prefer to carry a negotiable paper currency such as traveler's checks. In general, paper traveler's checks are issued in the currency of the country in which the traveler's checks are intended to be used. In addition, the traveler's checks typically are given a unique serial number for tracking the checks in the event the checks are lost or stolen. Further, the traveler's checks often must be countersigned by the holder before it may be negotiated.

Traveler's checks may be desirable as compared to conventional cash because of the signature authorization required and because of the ability to be re-compensated the face value of the traveler's checks if the checks are lost or stolen. The traveler may recoup his losses by reporting to the traveler's check issuing institution the serial numbers of the lost or stolen checks. Unfortunately, since the traveler's check issuing institution must verify that the checks were not used, or were subject to unauthorized use, such reimbursement is typically not immediate. Thus, the traveler is often placed at a financial disadvantage until such time as the verification is made and the traveler is reimbursed the amount of the lost checks.

Another method for providing the business traveler with the needed funds includes issuing the traveler a transaction card enabling the business traveler to electronically interface with a financial institution. For this purpose, a variety of cards exist. For example, a traditional credit card is a card which typically contains a magnetic stripe encoded with an account number which may be read at special terminals at a merchant's location. The merchant terminal may read the account information and may transmit the account information and the amount of the intended transaction to the credit card issuing institution. The credit card issuing institution may check credit available for the account against the requested transaction to determine if the requested transaction is within the transaction account credit limit (e.g., available credit). Where the requested transaction does not exceed the available credit, the issuing institution may extend the credit needed to complete the desired transaction.

Although the credit cards may be readily replaced if lost or stolen, using the credit card to complete a transaction has one clear drawback. In particular, the user of the credit card is often charged interest on the credit extended, which means that the traveler may end up paying more than the original amount needed to complete the desired transaction.

Another type of transaction card which may be used by a business traveler is a debit card. Typically, a debit card is not used to extend credit, but rather to debit or withdraw cash from an account for immediate payment to a merchant. The debit card typically corresponds to a checking account (or savings account) established by the holder of the debit card. The checking account is usually established at a financial institution located in the country of intended use. The checking account and the financial institution are usually only recognized in the country in which the financial institution is located. Thus, the debit card is typically not useful for completing transactions in countries other than where the checking account is located. This is especially important since the financial institution to which the checking account is linked may not be recognized in the country where the transaction is to be completed.

Still another type of transaction card which may be used by a business traveler to access funds is the automated teller machine (ATM) card. Similar to a debit card, the ATM card is typically linked to a checking (or savings) account maintained at a particular financial institution. The ATM card may allow the ATM cardholder to remotely access funds stored in the checking or savings account by presenting the card to an ATM which is connected to an ATM interchange to which the financial institution subscribes. Like a debit card, the financial institution must be recognized by the ATM network. Thus, ATM cards are typically not useful to a foreign business traveler who attempts to retrieve funds in a country other than where the checking or savings account is established. This is true since the financial institution is often not recognized in the country where the transaction is to be completed.

Still another method for providing the business traveler with funds includes providing the business traveler with a "prepaid" transaction card which is linked to a prepaid account. The prepaid account may be established at a financial institution located in the country in which the card is to be used. The prepaid method requires the prepaid cardholder to deposit into the prepaid account a predetermined amount of funds. Subsequent to delivery of the goods or services, the amount of the transaction for goods and services is charged against the amount available in the prepaid account. However, similar to the debit cards, the prepaid card is typically geographically limited in that the card may not be used in a country which does not recognize the financial institution where the prepaid account is established. Consequently, since it is often imperative that the business traveler be provided access to sufficient funds for payment of these expenses, a system and method is needed which will allow the business traveler to access the needed funds, whether or not the traveler's attempt to access the funds in his/her country of origin or the foreign country in which he is traveling.

SUMMARY OF THE INVENTION

The present invention addresses many of the shortcomings of the prior art, particularly in the ability of a foreign financial institution to issue a pre-paid card which may be used internationally. It should be noted that although the present invention is described with respect to a pre-paid card, the invention is not to be so limited. For example, the transaction card, as used herein, may be any card or form factor permitting negotiations of transactions in a different country from which the card is issued. In addition, although the invention is described for use in the United States, the invention is intended for use in any situation where the card issuing financial institution is located in a country different from the location of the desired transaction.

In accordance with one aspect of the present invention, a financial sponsor opens a prepaid card account with an issuing financial institution. The issuing financial institution provides the financial sponsor with a prepaid card including a distinct account number. The account number on the card corresponds to a prepaid account established at a financial institution on behalf of the financial sponsor.

As noted, the amount stored in the account may be provided by an account sponsor. In one embodiment, the monetary amount provided to the financial institution by the financial sponsor may be provided in the currency of the country where the financial institution is located. On the other hand, the financial sponsor may provide a monetary amount in any currency acceptable to the issuing financial institution. Further, the account associated with the prepaid card may be replenished, (e.g., reloaded) with additional funds when the monetary value in the account is depleted.

In one aspect, the issuing financial institution may be located in a country other than the United States, although it is contemplated that the financial institution may be located in the United States with the transaction occurring in a country other than the United States. The prepaid card, however, may be recognized in the United States when the prepaid card is presented for payment of goods and services domestically, whether or not the issuing financial institution is in the United States. In this context the prepaid card may be recognized not only outside the country where the issuing financial institution is located, but inside the country as well.

Using the prepaid card issued abroad, a person traveling in the United States may present the card for payment of expenses, or for retrieval of funds from a cash-dispensing machine such as an automated teller machine (ATM). In addition, the card may be presented to a merchant point of sale (POS) device maintained in the United States. The merchant POS device or ATM may request verification, or authorization from the foreign financial institution via a network. Such a network may include any means for permitting the merchant system, POS device or ATM to communicate with the prepaid card issuing financial institution to request verification, authorization or satisfaction of a transaction request. The foreign financial institution may then provide such authorization via the network for completion of the any transaction initiated at the merchant point of sale device or ATM.

BRIEF DESCRIPTION OF THE DRAWINGS

The subject invention will hereinafter be described in the context of the appended drawing figures, wherein like numerals denote like elements, and.

DETAILED DESCRIPTION OF EXEMPLARY EMBODIMENTS

Figure 1:
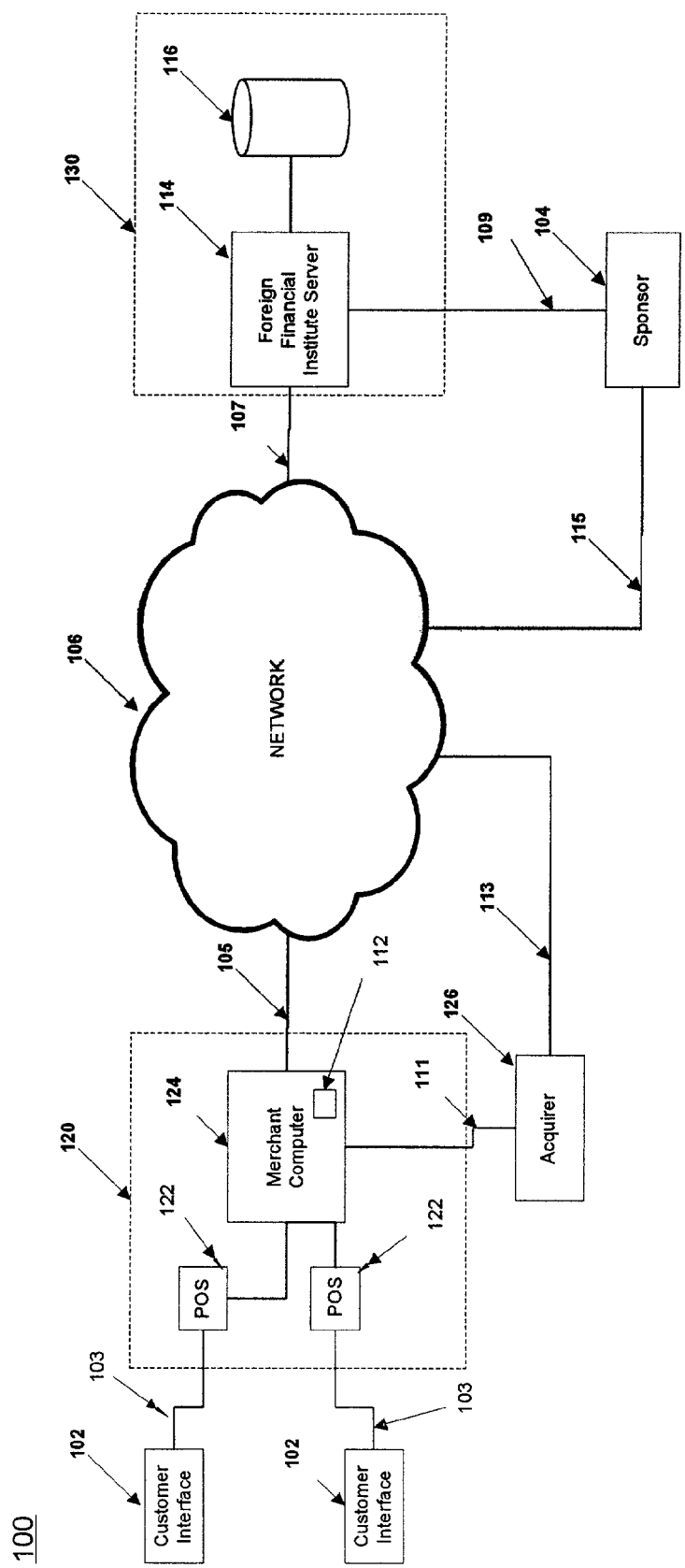
FIG. 1 is a schematic block diagram of a prepaid card issuer system in accordance with an exemplary embodiment of the present invention.

The present invention may be described herein in terms of functional block components and various processing steps. It should be appreciated that such functional blocks may be realized by any number of hardware and/or software components configured to perform the specified functions. For example, the present invention may employ various integrated circuit (IC) components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, or the like, with the various algorithms being implemented with any combination of data structures, objects, processes, routines or other programming elements. Further, it should be noted that the present invention may employ any number of conventional techniques for data transmission, signaling, data processing, network control, and the like. Still further, the present invention may incorporate security or fraud prevention components, such as, encryption, decryption and the like. For a basic introduction of suitable encryption or cryptography techniques, please review a text written by Bruce Schneier which is entitled "Applied Cryptography: Protocols, Algorithms, And Source Code In C," published by John Wiley & Sons (second edition, 1996), which is hereby incorporated by reference.

In addition, it should be appreciated that the particular implementations shown and described herein are illustrative of the invention and its best mode and are not intended to otherwise limit the scope of the present invention in any way. Indeed, for the sake of brevity, conventional data networking, application development, encryption, cryptography and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical electronic transaction or file transmission system.

To simplify the description of the exemplary embodiments, the invention is described as pertaining to a system facilitating communication between a domestic merchant system (or ATM) and a foreign financial institution card issuer using a computer network. Further, it should be appreciated that the network described herein may include any system for exchanging data or transacting business, such as the Internet, an intranet, an extranet, WAN, LAN, satellite communications, and/or the like. That is, communication between the parties to the transaction and the system of the present invention is accomplished through any suitable communication means, such as, for example, a telephone network, Intranet, Internet, point of interaction device (point of sale device, personal digital assistant, cellular phone, kiosk, automated teller machine, etc.), online communications, off-line communications, wireless communications, and/or the like. The users may interact with the system via any input device (e.g. cardholder interface) such as a keyboard, mouse, kiosk, personal digital assistant, handheld computer (e.g., Palm Pilot®), cellular phone and/or the like. Similarly, the invention could be used in conjunction with any type of personal computer, network computer, workstation, minicomputer, mainframe, etc., running any operating system such as any version of Windows, Windows NT, Windows 2000, Windows 98, Windows 95, MacOS, OS/2, BeOS, Linux, UNIX, or the like. Moreover, although the invention is frequently described herein as being implemented with TCP/IP communications protocols, it will be readily understood that the invention could also be implemented using IPX, Appletalk, IP-6, NetBIOS, OSI or any number of existing or future protocols. Further, the present invention might employ any number of conventional techniques for data transmission, signaling, data processing, network control, and the like. For example, radio frequency (RF) or other wireless techniques could be used in place of any network technique described herein.

Further still, the terms "Internet," "computer network" or "network" may refer to the Internet, any replacement, competitor or successor to the Internet, or any public or private internetwork, intranet or extranet that is based upon open or proprietary protocols. Specific information related to the protocols, standards, and application software utilized in connection with the Internet may not be discussed herein. For further information regarding such details, see, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997). LOSHIN, TCP/IP CLEARLY EXPLAINED (1997). All of these texts are hereby incorporated by reference.

While the terms "card accounts," "transaction account," "cardholder account" or "prepaid card account" may be used in the exemplary embodiments, the invention contemplates the use of any type of any financial or transaction account wherein an associated transaction card may be used to deplete the account when used for purchases. One such transaction account which is suitable for use with this invention is the described by Bishop et al., in the U.S. patent application Ser. No. 09/652,899 entitled "Methods and Apparatus for Conducting Electronic Transactions" filed Aug. 31, 2000 (herein incorporated in its entirety by reference).

Further still, it will be appreciated that many applications of the present invention could be formulated. For example, the system could be used to gain real-time transaction account approval when the requesting party requests real-time validation or authorization of the prepaid account. In addition, the system could be used by the holder of the prepaid card to check account status, balance, or transaction account financial activity.

Furthermore, the prepaid cardholder, and the financial card sponsor, described herein, may represent individual people, entities or businesses. The prepaid card issuing institution, financial institution, issuer or issuing institution may represent any financial institution configured to interface with the financial card sponsor and provide a prepaid card for use by a prepaid cardholder. The prepaid card issuing institution may be located in the country of origin of the prepaid cardholder, in a country other than the country of origin of the prepaid cardholder, and/or in a country different from the country including the merchant system or ATM issued by the prepaid cardholder. In addition, such a financial institution may be any such system permitting the, prepaid cardholder to check available monetary amounts (e.g., balance inquiry), check transaction activity, or the like. The financial institution may be any such system permitting a merchant system to verify funds available for completing a commercial transaction, or authorizing available funds for an ATM transaction.

The payment network (e.g., transaction processing network or system) may include existing proprietary networks that presently accommodate transactions for credit cards, debit cards, and other types of financial/banking cards, such as, for example, the American Express®, MasterCard® and/or VisaNet® network.

In an exemplary embodiment, the present invention provides means for a foreign financial institution to issue a prepaid card for use domestically. As used herein, "domestic" and "foreign" are relative terms. "Domestic" refers to the country of intended or requested transaction, and "foreign" refers to the country where the financial account is located and where the country is different from the domestic country. In particular, a method and system is disclosed which provides for a prepaid card which may be used domestically, and which is issued by a foreign financial institution. In this context, the foreign financial institution may be one located in a country other than where the holder of the prepaid card initiates a transaction request. The transaction request may be a purchase request, request for cash back, a request for a balance inquiry, request for transaction or prepaid card usage history, or any such transaction request permitting the prepaid cardholder check account activity or to access the funds stored in a prepaid transaction account.

The prepaid card account in accordance with an exemplary embodiment of the invention may be opened by a financial card sponsor, such as the prepaid cardholder employer or benefactor, etc. In some instances, the sponsor and the prepaid cardholder may be the same entity. The sponsor may open the account under any business as usual as is standard as determined by the financial institution. The financial institution may require the sponsor to deposit a fixed monetary amount (e.g., monetary value) into an account uniquely corresponding to the specific prepaid card. The amount deposited in the account may be deposited periodically or at any given time. The amount may be deposited in the currency of the country in which the financial institution is located or in any other currency which may be accepted by the financial institution. In addition, the amount deposited in the account may serve as a spending limited for the prepaid card. In particular, the prepaid cardholder may not be permitted to incur expenditures exceeding the total monetary value stored in the corresponding prepaid card account. In some instances, the sponsor may be permitted to make provisions for payment of fees or expenditures incurred where the prepaid cardholder exceeds the amount stored in the account. Such provisions may be specific to the business practices of the financial institution.

Once the account is opened, the financial institution may store in a financial database account identifying information corresponding to the prepaid card. The account information may be any information permitting the financial institution to correlate the prepaid card to the account. For example, the account information may include the name of the prepaid cardholder, the account number corresponding to the prepaid account, the monetary value stored in the account, the expiration date of the prepaid card, the name of the financial sponsor, etc. The database containing the account information may be managed by a financial institution server. The financial institution server may be configured to receive transaction requests from a merchant POS device or ATM, authorize the transaction request, and provide payment of funds for the completion of the transaction, etc. Authorization of the transaction request may include locating the file corresponding to the prepaid card account number provided by the merchant (e.g. matching the prepaid card account number with the correlative prepaid account), verifying that the funds are available for completing the transaction, and transmitting the necessary funds for the transaction's completion. In one exemplary embodiment the financial institution may send the necessary funds in batch transmissions. That is, the financial institution may group (e.g., batch) the necessary funds in accordance with a receiving institution (e.g., merchant) identified in the transaction request, or series of transaction requests. The funds may be organized in a batch file. Once batched, the batch file may be periodically provided to the receiving institution. In some instances, authorizing the transaction may include locating the account file corresponding to the prepaid card and transmitting a card usage history and/or account balance. In this context, the account balance may include a reporting of the monetary value remaining in the account, as well as, the total of expenditures to date.

The prepaid card may include means for storing a readable prepaid card identifier. The prepaid card identifier may be any account code readable by a merchant POS device or ATM, where the account code corresponds to the prepaid card account maintained by the financial institution server. The card identifier information may be stored on the prepaid card using any technology capable of physically encoding the account information on the prepaid card. Suitable technologies include magnetic stripe technology, bar coding technology, smart card technology, radio frequency ID, infrared blue tooth or the like. An example of such technology is disclosed in U.S. Pat. No. Re 36,365 issued Nov. 2, 1999 to Levine et al.

On one surface of the prepaid card may be the name of the prepaid cardholder, and an account number corresponding to the prepaid account opened by the sponsor. As used herein, the "account number" may be any device, code, or other identifier/indicia suitably configured to allow the prepaid cardholder to interact with the merchant system or to communicate with the foreign financial institution. In one exemplary embodiment, the prepaid card may include any authorization/access code, personal identification number (PIN), Internet code or other identifying indicia such as may be located on reward cards, charge cards, credit cards, debit cards, prepaid cards, telephone cards, smart cards, magnetic stripe cards, bar code cards, and/or the like. The account number may be embossed on the card's surface. Alternatively, the account number may be imprinted on the card but not embossed. Where the account number is imprinted and not embossed, the prepaid card must still be verified via electronic communications. In one embodiment, portions of the account number and corresponding account identifying code may be encoded in card identifier information stored on the prepaid card. The prepaid card may be issued to the prepaid cardholder in plastic form similar to a conventional credit card or identification card, or the like. The card identifier information may be readable by any suitable electronic, magnetic and/or optical device capable of retrieving (e.g., reading) the identifier information and transmitting or providing the identifier information to a device configured to receive and/or decrypt the account number. The account number and/or the encoded account number (collectively "account number") may be similar to the numbers used on conventional credit card systems. For example, the account number may be a sixteen digit number such as are commonly used by conventional credit card granting agencies although each issuing financial institution may have its own numbering system.

The account number may be distributed and stored in any form of plastic, electronic, magnetic, and/or optical device capable of transmitting or downloading data from itself to a second device. As noted, the account number may be, for example, a sixteen-digit credit card number, although each financial institution system may have its own numbering system, such as the fifteen-digit numbering system used by American Express. Each prepaid card numbers comply with that financial institution system's standardized format. For example, the account number may be such that where a sixteen-digit format is used, the account number may typically consist of four spaced sets of numbers, as represented by the number "0000 0000 0000 0000". The first five to seven digits of the account number may be reserved for processing purposes and identify the issuing bank, card type and etc. In this example, the last sixteenth digit may be used as a sum check for the sixteen-digit number. The intermediary eight-to-ten digits may be used to uniquely identify the customer. The account number may be configured as data stored as Track 1 and Track 2 data as defined in ISO 7813, and further may be made unique to the prepaid card. In some exemplary embodiments, the account number may include a unique prepaid account number and user identification number, as well as specific application applets.

The account number assigned to the prepaid account and encoded on the prepaid card is preferably recognizable by the merchant POS or ATM systems. Such recognition involves recognizing that the account number has been issued by a financial institution authorized to conduct business on the merchant POS or ATM payment network. The financial institution may be recognized as authorized by use of a code or signature readable by the POS or ATM.

Where the prepaid card issuing institution is located outside the United States, the issuing institution may be issued a code authorizing the issuing institution to transact business over, and be recognizable by, United States based payment networks. These special authorizing codes may be included in the prepaid card account number. For example, in one exemplary embodiment, the account number may include a bank identification number (BIN) approved by the American Banking Association and a code which may direct the merchant system to the appropriate financial institution for transaction request approval. Since the foreign financial institution is issued a BIN which is recognized domestically, domestic merchant POS and ATM systems may recognize the foreign financial institution as appropriate for conducting transactions over the United States based payment network. That is, unlike conventional cards, such as debit cards and ATM cards, the present invention ensures that the foreign prepaid cardholder is provided means for completing a financial transaction domestically, even though the correlative prepaid account is issued by a financial institution located in a foreign country.

Once the merchant determines that the account number includes a payment network authorizing code, the merchant (or ATM) may process the prepaid cardholder's transaction request. That is, the merchant may seek to determine whether the prepaid cardholder's requested transaction is authorized. The merchant may send the transaction request corresponding to the cardholder's desired transaction to the foreign financial institution. The transaction request may include an account identifier corresponding to the cardholder's transaction account at the financial institution. The financial institution may seek to verify whether the account identifier corresponds to an authorized prepaid cardholder account. Verification may include comparing the account identifier with authorized prepaid account identifications stored in a financial institution database and maintained by a financial institution server. In this context the account identifier may be the account transaction number, a correlative account number, financial institution BIN, personal identification number or the like or any combination thereof. Where the financial institution server successfully matches the account identifier to an authorized prepaid account, the financial institution may be deemed to have verified that the account identifier may be used to conduct business on the financial institution system. The financial institution server may then seek to determine whether sufficient funds exist in the prepaid account to complete the desired transaction. That is, the monetary value stored in the prepaid account on the financial institution database may be compared to the amount of the requested transaction. If the value of the requested transaction is less than or equal to the amount stored in the prepaid account, the financial institution may authorize the transaction. The financial institution may then send notification to the merchant that the transaction is authorized.

Upon receiving notification that the transaction is authorized, the merchant system may seek to have the transaction satisfied. The merchant system may send a file containing a record of the transaction to the foreign financial institution, whereby funds sufficient to account for the transaction may be electronically transmitted directly to the merchant. Alternatively, the merchant may send the settlement file to an "acquirer." In this context, an acquirer is an entity which receives the settlement file including the account identifying indicia (i.e., account number) and summary of changes, and forwards the settlement file to the foreign financial institution for satisfaction. The acquirer may individually send the settlement file to the foreign institution, or may organize (e.g., batch) all settlement files corresponding to a particular account or foreign financial institution prior to sending the batch files to a foreign institution for satisfaction of the transactions. Where the acquire batches the settlement files, the batched settlement files may be sent to the foreign financial institution as one batch file containing several transactional requests. The foreign financial institution may receive the batch requests and satisfy each individual settlement file or transaction request accordingly. In another exemplary embodiment where multiple settlement files correspond to one merchant the foreign financial institution may batch the funds necessary to satisfy the settlement files and forward the merchant batch to the merchant. Alternatively the financial institution may send the batch files to the acquirer, which may in turn forward the batch files to the appropriate merchant.

In some instances, the prepaid card may not be authorized because the prepaid account identifier may not be matched to any file stored on the financial institution database. Where no match is made between the account identifier provided by the cardholder and the prepaid account identifiers stored on the financial institution database, the prepaid account number provided to the financial institution will be deemed unauthorized and/or invalid. The financial institution server may then return a message to the merchant point of sale device or ATM notifying merchant, the prepaid cardholder, or the ATM that the requested transaction has been denied processing.

As noted, once the account number is verified by the financial institution, the financial institution server may seek to determine whether the prepaid cardholder's requested transaction may be completed. In one instance the financial institution server may compare the monetary amount of the requested transaction with the monetary amount stored in the prepaid card account located on the financial institution database. If the requested transaction amount exceeds the amount stored in the prepaid card account, the prepaid cardholder's requested transaction may be denied.

In addition, a denial message may also be sent where the prepaid cardholder attempts to use a prepaid card which is expired. That is, a sponsor or financial institution may predetermine the length of time during which the prepaid card may be used. The length of time may be noted by an expiration date, after which the prepaid card may not be used. Where the expiration date approaches, the financial institution may contact the sponsor and notify the sponsor that the prepaid card will expire. The financial institution may contact the sponsor via any communication network for sending and receiving electronic communications. Alternatively, the financial institution may contact the sponsor via traditional mail methods.

However, it should be noted that the prepaid card account is re-loadable or restorable. That is, where the value stored in account is depleted or nearly depleted, the financial institution may permit the sponsor to restore the value to any suitable monetary level. The financial institution may notify the sponsor that the value stored in the account is depleted using any suitable communication network for sending and receiving electronic communications, as described above. Alternatively, the financial institution may notify the sponsor that the account is depleted using translation postal network (e.g., notification letter).

In some instances, the financial institution may request additional verification of the prepaid cardholder's identity. For example, where the merchant POS device or ATM requires the prepaid cardholder to enter a unique security code corresponding to the unique prepaid card account stored on the financial institution database, the financial institution may seek to authenticate the provided security code (e.g. personal identification number (PIN), biometric fingerprinting, electronic signature, or the like). The financial institution may receive the security code and the compare the security code to security codes stored on the financial institution database and which correlates to the prepaid card account number. If a match is made, the requested transaction may be permitted to proceed. Contrarily, if a match is not made, the transaction request may be denied and the cardholder transaction terminated.

The operation of the invention may be understood more fully with reference to FIG. 1. FIG. 1 illustrates an exemplary system 100 in accordance with an exemplary embodiment of the present invention. System 100 includes an online infrastructure that may be used to authorize a transaction request received from a merchant. With reference to FIG. 1 exemplary card provider system 100 may include a number of customer interface systems 102, a merchant system 120, and foreign financial institution system 130, which may be configured to intercommunicate via a network 106. The system 100 may additionally include an acquire 126 configured to receive settlement requests from merchant system 120 and provide the settlement requests to the foreign financial institution system 130 via network 106. System 100 may further include a financial sponsor system 104, which may be configured to communicate with foreign financial institution system 130 to open a prepaid account, replenish prepaid account funds, or receive account activity reports from foreign financial system 130.

Customer interface 102 may include any conventional combination of hardware and software components configured to allow a prepaid cardholder to communicate over network 106. For example, customer interface 102 might include a standard personal computer (PC) comprising a CPU, monitor, storage, keyboard, mouse, and communication hardware appropriate for the given data link 103 (e.g., V.90 modem, network card, cable modem, etc.). In alternate embodiments, customer interface system 102 may be a personal data assistant (PDA) capable of manipulating images and communicating with merchant system 120. Customer interface system 102 typically may typically include an operating system (e.g., Windows 95/98/2000, Linux, Solaris, MacOS, and/or the like) as well as various conventional support software modules and drivers typically associated with computers. Customer interface system 102 may also include application software configured to communicate via merchant system 120 over network 106 with financial institution system 130. For example, one such application software may include a world wide web (WWW) browser or any other communication software. In an exemplary embodiment, customer interface system 102 includes a conventional Internet browser application that operates in accordance with HTML and HTTP protocols such as Netscape Navigator (available from the Netscape Corporation of Mountain View, Calif.) or Microsoft Internet Explorer (available from the Microsoft Corporation of Redmond, Wash.).

Merchant system 120 may include a network of point of sale devices 122, configured to communicate with customer interface 102 for receiving the prepaid card account identifying information. As noted, the present invention is described with respect to a point of sale device to simplify the understanding of the operation of the invention. In this context, the point of sale device 122 may be any device suitable for receiving the prepaid card account number and transmitting the card account number to a merchant computer 124 for processing.

Merchant system 110 may further include a merchant server 112 configured to communicate with financial institution system 130 via a network 106. The merchant server 112 and the financial institution server 114 may be configured to send and/or receive information (e.g., cardholder identity, prepaid account number, expiration date, transaction purchase history, etc.) related to a transaction request (e.g. log on request, request for access, purchase request, request for pre-approval application, etc.). In an exemplary embodiment, the transaction request information provided by the merchant may include a code identifying the nature of the transaction. The code may include information identifying the transaction as a purchase request, inquiry (e.g., balance, transaction history) and/or the like.

The merchant server 112 may be configured to receive the transaction request and/or transaction initiating indicia from the customer interface 102 and seek validation of the information provided from the issuing financial institution 130. In particular, the merchant server 112 may send a validation or authorization request to the issuing financial institution server 114. The financial institution server 114 may validate the information by matching the information contained in the transaction request to data files stored on a financial institution database 116. Once the information is validated, a corresponding transaction authorized signal may be forwarded to the merchant server 112, for use in determining whether to complete the transaction requested by customer interface 102.

Merchant server 112 and financial institution server 114 may be any conventional servers (e.g. transaction account server) known in the art, including means for receiving transaction requests (e.g., balance, transaction history, or purchases request, etc.) via the network 106, processing such transaction requests and sending validation (e.g., sending confirmation or denial) of the transaction requests to customer interface 102. Customer interface 102 may be suitably coupled to the merchant system 120 via data lines 103. Merchant system 120 may be suitably coupled to the foreign institution system 130, via network 106 via data links 105 and 107. In addition, where the system 100 further includes a financial sponsor system 104 configured to transmit a request to open a prepaid card account and to receive an accounting (e.g. account activity, depletion of funds, account expiration), such financial sponsor system 104 may be connected to foreign financial institution system 130 via data link 109 or via network 106 and data links 115 and 107.

Merchant server 112 and issuing institution server 114 may comprise any number of hardware, software, and networking components suitable to provide an user interface to a network 106. In addition, servers 112 and 114 may be configured to manage databases, such as for example database 116. In one embodiment, server 112 and server 114 may include Sun Ultra SPARC Enterprise 250 and 450 servers which may be used in conjunction with a Sun Solaris 7 or Linux operating system, Apache web server software, and an Oracle 8 or MySQL database system. Of course, particular hardware and software components used in servers 112 and 114 will vary widely from embodiment to embodiment. Furthermore, servers 112 and 114 may represent a "cluster" or group of separate computer systems providing the functionalities described herein.

A variety of conventional communications media and protocols may be used for data links 103, 105, 107, 109, 111, 113 and 115. Such links might include, for example, a connection to an Internet Service Provider (ISP) over a local loop as is typically used in connection with standard modem communication, cable modem, Dish networks, ISDN, Digital Subscriber Line (DSL), or various wireless communication methods. In addition, customer interface system 102 and merchant system 120, might each independently and separately, or collectively, reside within a local area network (LAN) which interfaces to network 106 via a leased line (T1, D3, etc.). Such communication methods are well known in the art, and are covered in a variety of standard texts. See, e.g., GILBERT HELD, UNDERSTANDING DATA COMMUNICATIONS (1996), hereby incorporated by reference.

In an exemplary system 100, foreign financial institution database 116 may include a plurality of distinct locations for maintaining individual cardholder, cardholder account, account security, or financial sponsor information. Such information may include cardholder information, such as cardholder identity, account number, account balance, amount available, cardholder PIN, purchase history, etc. (collectively "customer profile"). For example, in one embodiment, a distinct location may include the customer profile of a single prepaid cardholder. The database 116 may be a graphical, hierarchical, relational, object-oriented or other database, and may be maintained on a local drive of server 114 or on a separate computer coupled to server 114 via a local area or other network (not shown). In one embodiment, the database may be a collection of ASCII or other text files stored on a local drive of server 114. Prepaid cardholder account information may be suitably retrieved from the database 116 and provided to customer interface 102 or to merchant system 120, upon request via a server application, as described more fully below.

As noted, within database 116 there may be stored a plurality of individual distinct data locations corresponding to the customer profile for each prepaid cardholder. In one embodiment, database 116 may be managed by the financial institution server 114 which may be maintained on a prepaid card issuer (e.g., foreign financial institution) system 130 with which the prepaid cardholder has an established prepaid account. The prepaid account may be associated with any suitable service such as a banking service capable of use for commercial transaction purposes. For example, the prepaid account may be associated with checking, savings, interest bearing accounts or the like. Further, the prepaid account may additionally allow the merchant system 120 to recover payment for transactions made by an individual prepaid cardholder.

Figure 2:
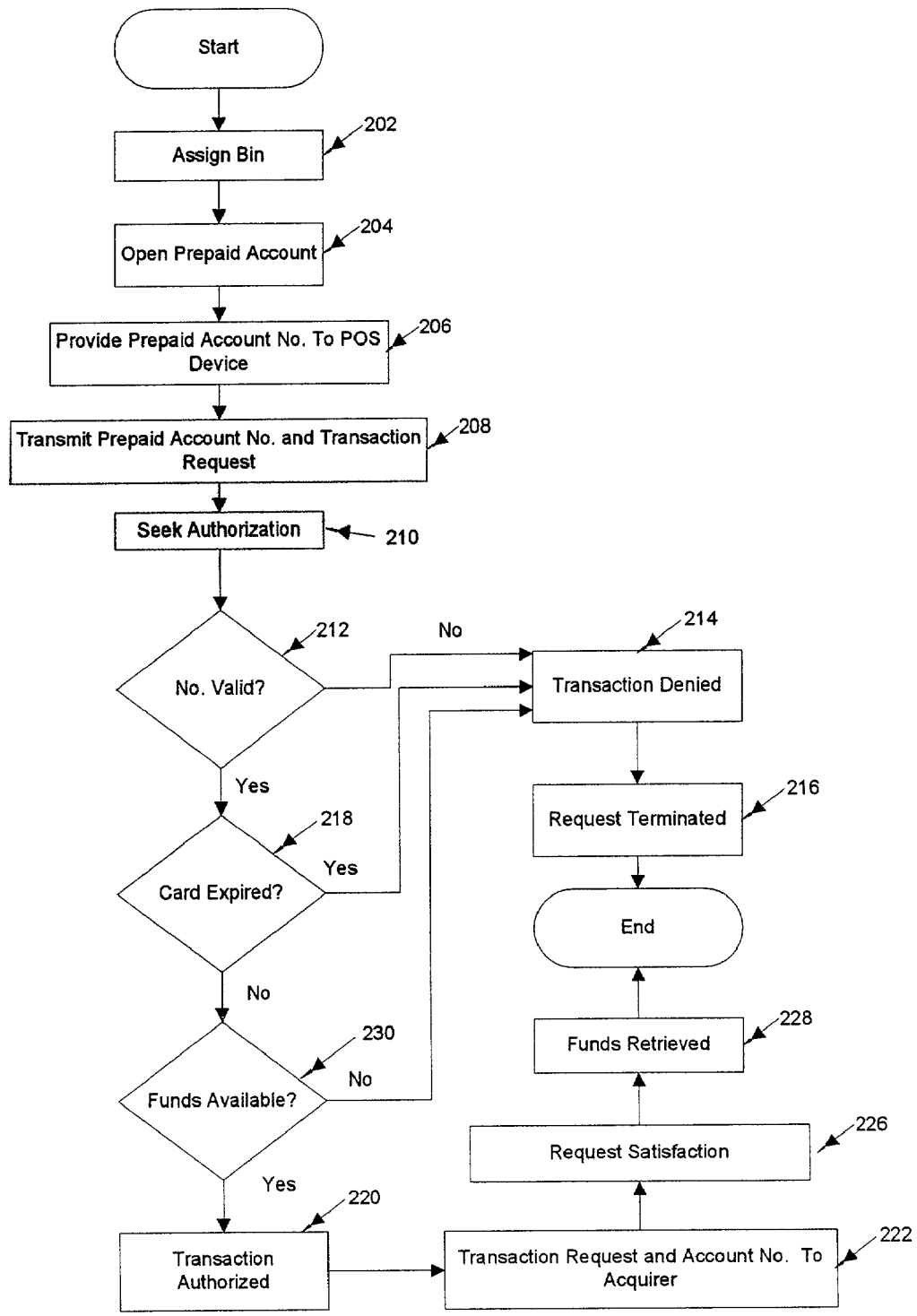
FIG. 2 is a flowchart illustrating a system and method for ensuring completion of a transaction request using a prepaid card issued by a foreign financial institution in accordance with an exemplary embodiment of the present invention.

The operation of the present invention may be more fully understood with reference to FIG. 2 and continued reference to FIG. 1. FIG. 2 depicts a flowchart of an exemplary prepaid card system 200 in accordance with the present invention. As shown, system 200 may begin with the foreign financial institution system 130 being assigned a domestic payment network authorization code (i.e., a BIN). To aid in increased understanding of the invention, the flowchart in FIG. 2 and the system in FIG. 1 is described with respect to a foreign financial institution located outside the United States and with respect to domestic transactions taking place in the United States. Thus, foreign financial institution system 130 is described as being assigned a BIN approved by the American Banking Association (step 202) or any similar authorizing protocol operating in the United States. The BIN is such that it may be recognized and accepted by any network configured to accept BINs domestically, and for which network the financial institution may be registered. In this context, the BIN may be used to identify the foreign financial institution system 130, even though the financial institution may be located abroad (e.g., not domestically).

In one exemplary embodiment, the foreign financial institution system 130 is such that it may be configured to establish a prepaid account for use in satisfying financial transaction requests. The establishment of the prepaid account may be accomplished by any means as determined by the foreign financial institution. As noted, the foreign financial institution system 130 may include an establishment program for facilitating the prepaid account establishment. In some instances, it may be necessary for the financial institution to institute an establishment program prior to beginning the prepaid account process. In some cases, however, the financial institution system 130 may have an establishment program already in place.

The foreign financial system 130 may include a database 116, wherein distinct database locations may be reserved for storing the prepaid account information (e.g., account number, monies available, transaction history, expiration date, financial sponsor identifier, etc.) and/or customer profile (e.g., prepaid account holder name, address, PIN, etc.). The distinct database locations may correspond to distinct prepaid accounts such that the prepaid account information is correlated to the customer profile.

The foreign financial system 130 may further include a foreign financial institution server 114 configured to manage database 116. The server 114 may be such that it may enable the financial system 130 to receive transaction authorization requests, and validate such request, as is described more fully below.

Once the financial institution system 130 has been provided a BIN (step 202) and suitably establishes a means for providing a prepaid account, a financial sponsor 104 may open a prepaid account with the financial institution system 130 (step 204). The financial sponsor 104 may open the prepaid account using any means as determined by the financial institution system 130. In one embodiment, the financial sponsor 104 may open a prepaid account by submitting an application for a prepaid account including the prepaid account cardholder name and account expiration date, and providing funds to the prepaid account for establishing the spending limit associated with the account. The funds may be provided in the currency of the country in which the foreign financial institution system 130 is located or any currency acceptable to the system 130. The funds may be provided electronically over data link 109, via check, money order or in any manner as determined by the foreign financial institution system 130.

Upon opening the account, the sponsor 104 may provide a prepaid card to a prepaid cardholder using the card in a country different from the prepaid cardholder's country of origination. The prepaid cardholder may travel to the foreign country and attempt to complete a financial transaction, such as, financial transaction for goods or services. To complete the transaction, the prepaid cardholder may present the prepaid card account information to a merchant point of sale (POS) device 122 via a customer interface 102 (step 206). The prepaid account information may be presented in the form of an imprinted or embossed card wherein the prepaid account number is encoded on the card in a magnetic strip, barcode or the like. The prepaid cardholder may present the prepaid account information to the POS device 112 along with a transaction request. The POS device 122 may further transmit the prepaid card account information and transaction request to a merchant computer system 124 including a merchant server 112 (step 208).

In one embodiment, the account information may include a unique routing code which may be used to direct the merchant server 112 to the appropriate financial institution system 130. In one example, the unique routing code may be a BIN or may be coupled with a BIN. Merchant server 112 may be configured to receive the account information and the transaction request, and provide the account information and transaction request to a foreign financial institution system 130 for authorization (step 210). The merchant server 112 may identify the appropriate financial institution system 130 for receipt of the account and transaction request information by the assigned BIN and institution's unique routing code.

Authorization of the transaction may take place in several steps. For example, the foreign financial institution system 130 may include a server 114 configured to received the account information and match the account information to its corresponding data location on foreign financial institution system database 116 (step 212). In an exemplary matching method, the account information may be compared to the distinct account locations on database 116 to determine if the prepaid account information may be found in the database 116. A match is made if corresponding account information is found on the financial institution database 116. If a match is made, the foreign financial system server 130 may indicate that the account number is valid. However, the foreign financial system server 130, or alternatively, the merchant system 120, may require additional verification of the prepaid card authenticity. For example, the prepaid cardholder may be required to provide a PIN number, biometric fingerprint, electronic signature, or the like, as a form of identity verification. The identity verification may be received by the financial institution system 130, via network 106, merchant system 120 and customer interface 102. The foreign financial institution server 114 may seek to match the provided identity verification to the identity verification information stored in the correlative customer profile area on database 116. Where a match is made, the transaction authorization process may continue. Where the account information and/or associated identity verification information are not found on database 116, the financial institution server 114 may provide the merchant system 120 with a transaction denied message (step 214) and the transaction request may be terminated (step 216).

Even where the account information and associated PIN are matched on the database 116, the system 130 may further determine whether the transaction is authorized for completion. In particular, the foreign financial system 130 may determine whether the prepaid account has sufficient funds for completing the transaction (step 230), or whether prepaid account card is expired (step 218). That is, the system 130 may seek to determine if the funds are available in the prepaid account to complete the transaction, or if date of the transaction request falls after the date on which the prepaid account is to expire. As noted, the expiration date may be a date determined by the sponsor 104 or by the foreign financial institution system 130. Where the transaction date falls after the expiration date of the prepaid account, the transaction request may be denied (step 214) and the transaction request may be terminated (step 216). Similarly, where the monetary amount of the requested transaction exceeds the funds available in the prepaid account, the transaction request may be denied (step 214) and the transaction request may be terminated (step 216). It should be noted, that in verifying whether sufficient funds exist, financial institution server 114 may first convert the monetary amount noted in the transaction request to the correlative amount in the domestic currency. The conversion may be made using available international currency conversion rates.

In the event that the financial institution server 114 matches the prepaid account information to correlative matching account information on database 116, verifies that the prepaid account is not expired, and that the transaction request does not exceed the stored monetary value, the transaction may be authorized (step 220). Upon authorization, the financial system server 114 may provide the merchant system 120 with a transaction authorized message via any suitable communications network, permitting the transaction request for goods or services to proceed. The merchant system 120 may then seek to have the transaction request satisfied. In this context, the transaction request may be satisfied where the merchant system provides a request for payment of goods and services which is responded to by the financial institution system 130 with a transfer of funds for payment of the goods and services provided.

In seeking settlement of the transaction request, the merchant system 120 may directly request payment from the financial institution system 130, or the merchant system may provide a settlement request to an acquirer 126 (step 222). The acquirer 126 may be any entity configured to receive settlement request from a merchant system 120 and provide the settlement request to the foreign financial institution 130 (step 224). In one embodiment, the acquirer 126 may send the settlement request individually to the financial institution system 130. In another embodiment, the acquirer 126 may provide a multitude of settlement requests to the financial institution system 130, where the settlement requests are organized in a batch. The settlement request may be organized in accordance with any indicia to identifying the foreign financial institution for receiving the batch. For example, the batch may be organized by the BIN of the financial institution system 130, by the prepaid card account number, by the transaction date, or the like.

Upon receiving the settlement requests, the financial institution system server 114 may process the request for payment to merchant system 120. The financial institution system server 114 may match the transaction requests to the appropriate distinct data location on database 116 corresponding to a particular prepaid account. Funds necessary for satisfaction of the transaction request may be retrieved from the prepaid account by server 114 (step 226) and provided to the merchant system 120 (step 228). While the funds stored in the financial account may be provided in the currency of the country in which the financial system 130 is located, the funds transferred to the merchant system 120 may be converted to the currency of the country in which the merchant system 120 is located. The funds may be converted by foreign financial institution system 130 or by an acquirer 126 prior to forwarding the funds to merchant system 120. For example, in one exemplary embodiment the foreign financial institution 130 may provide the funds to an acquirer 126 via a network 106. The acquirer 126 may receive the funds in the currency of the country wherein the foreign financial institution system 130 is located and may convert the funds into the currency of the country wherein merchant system 120 is located. That is, the funds may be permitted to undergo a currency conversion, wherein the funds are converted to the a second currency based on the existing currency exchange rate. If incorrect currency exchange rates are used, thereby creating a deficit to the merchant, the deficit may be charged against (e.g., deducted from) the prepaid account. If the deficit charged against the prepaid account creates an insufficient funds situation, the loss may be born by the financial institution system 130. Similarly, where the incorrect exchange rate creates a surplus (e.g., by causing the system 130 to forward more money than required, the surplus may be returned to the system 130 and added to the prepaid account balance. In one exemplary embodiment, the funds may be provided electronically. An exemplary method for providing funds electronically is disclosed in U.S. Pat. No. 6,304,860 issued Oct. 16, 2001 to Martin, Jr. et al., which is incorporated herein by reference.

In some cases, the funds stored in the prepaid account may become depleted due to the submitted settlement request. In this instance, the foreign financial institution may notify the financial sponsor system 104 and the cardholder of the prepaid account's depleted status. Such notification may be provided to the sponsor system 104 and cardholder electronically, in accordance with established methods for sending electronic communications. Alternatively, the notice may be provided to the sponsor system 104 and the cardholder via traditional postal methods (e.g., notification letter). Upon notification of the account's depleted status, the sponsor may be permitted to provide additional funds to the prepaid account (e.g., reload the account) for future usage by the prepaid account cardholder.

As noted, the prepaid card account includes a expiration date determined by the financial sponsor 104 or the foreign financial institution, after which the prepaid account may not be valid for completing transaction requests. Foreign financial institution system 130 may be configured to provide notice of an impending expiration date to the sponsor 104 and/or the prepaid cardholder. The expiration date notice may be provided electronically, or via traditional postal methods. Upon receipt of the expiration notice, the sponsor 104 may be permitted to determine if new expiration date should be associated with the account. Where a new expiration date is chosen, the prepaid account may be authorized for usage until the termination of the new expiration date. Contrarily, where the sponsor 104 elects not to establish a new expiration date, the funds remaining in the prepaid account may be returned to the sponsor 104. The funds may be returned electronically, or via traditional postal methods, and may be returned in the currency of the country in which the financial institution system 130, the sponsor 104 or the prepaid cardholder is located. It should be noted that the financial sponsor 104 may wish to close the account prior to the expiration date. In such a case, the sponsor 104 notifies the server 114 of its intent to close. Upon closing the prepaid account, the server 114 may forward any remaining funds to the sponsor 104. Alternatively, the funds may be returned to the prepaid cardholder. The decision on who receives the funds upon closing the prepaid account may be made by the sponsor 104 or the foreign financial institution system 130 when opening the prepaid account.

The transaction request provided by merchant server 112 to financial institution 130 may include a request for a reporting of prepaid account activity (e.g., balance, record of transaction request, record of transaction request satisfied, etc.). In this instance, financial institution server 114 may be provided the transaction request directly, or via an acquirer (step 224). To honor the transaction reporting request, the financial server 114 may seek to match the prepaid account number to one of the distinct database locations storing prepaid account information. In particular, the server 114 may determine whether the account number may be matched on the database 116, retrieve the corresponding matching information stored on the database 116 and provide the requested information to the customer interface 102 via the network 106 and merchant system 120.

In the foregoing specification, the invention has been described with reference to specific embodiments. However, it will be appreciated that various modifications and changes can be made without departing from the scope of the present invention as set forth in the claims below. For example, various processing steps may be combined or eliminated as required, such as for example, permitting the foreign financial institution server 114 to establish a prepaid account prior to receiving a BIN, or providing a transaction settlement request directly to the foreign financial institution 114, without the use of an acquirer 126. Further, various system elements described herein may be eliminated, and various steps may be performed by one or more of the elements described herein, such as for example, permitting the prepaid cardholder to communicate directly with a merchant system 120 independently of a POS device 122. In addition, other suitable elements may be substituted for the elements described herein, or inserted between the connecting lines of the embodiments set forth, without departing from the scope of this invention. Further still, the specification and figures are to be regarded in an illustrative manner, rather than a restrictive one. As such, any modifications resulting in a system which is suitable for practicing the invention, are intended to be included within the scope of the invention. Accordingly, the scope of the invention should be determined by the appended claims and their legal equivalents, rather than by the examples given above. For example, the steps recited in any of the method or process claims may be executed in any order and are not limited to the order presented in the claims (e.g., validating available funds prior to verifying the prepaid card expiration date, etc.).

In addition, the benefits, other advantages, and solutions to problems described have been illustrated above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A system for providing a prepaid card account maintained by a a first country financial institution located in a first country, said prepaid card account configured for effecting payment of at least one of goods and services in a second country, said system comprising:
    a said first country financial institution system which issues a prepaid card account which is used in said second country, wherein said prepaid card account is identified by an account number including a second country payment network authorization code formatted such that said second country payment network authorization code is capable of being processed by said second country payment network, and
    wherein said second country payment network authorization code is issued to said first country financial institution system by a second country financial institution and said second country payment network authorization code is not recognized by said first country financial institution system; and,
    wherein said second country financial institution is configured to communicate with a merchant system, wherein said merchant system is located in said second country, wherein said merchant system is configured to receive said account number and a transaction request related to a transaction using said prepaid card account, wherein said transaction request includes said second country payment network authorization code; and
    wherein said merchant system is configured to transmit said second country payment authorization code to said second country payment network;
    wherein said second country payment network is configured to transmit said transaction request and said account number to said first country financial institution system such that said first country financial institution system authorizes the prepaid card account, debits the prepaid card account at said first country financial institution system and transmits an authorization to said second country payment network; and,
    wherein said second country payment network further transmits said authorization to said merchant system to facilitate the transaction and said merchant system receives a settlement of the transaction from said first country financial institution.

2. The system according to claim 1, wherein said merchant system further includes a merchant point of sale (POS) device configured to communicate with said customer interface and said merchant server, said POS device configured to receive said account number and provide said account number and said transaction request to said merchant server.

3. The system according to claim 1, wherein said prepaid card account is reloadable.

4. The system according to claim 1, wherein said prepaid card account is fully maintained by said first country financial institution system.

5. The system according to claim 1, wherein said first country financial institution system further includes a financial institution server configured to communicate with said merchant server.

6. The system according to claim 1, wherein said first country financial institution system further includes a financial institution database, said financial institution database including a plurality of distinct prepaid card account storage locations wherein at least one of said plurality of distinct prepaid card account storage locations stores a unique prepaid card number, said unique prepaid card number corresponding to said account number.

7. The system according to claim 1, wherein said account number further includes a unique transaction routing code corresponding to said foreign financial institution system.

8. The system according to claim 1, wherein said merchant server provides said account number and said transaction request to said first country financial institution system, in accordance with said payment network authorization code.

9. The system according to claim 1, wherein said first country financial institution system is configured to match said account number to a corresponding one of a plurality of prepaid card numbers, said first country financial institution system further configured to retrieve said corresponding one of a plurality of prepaid card numbers in response to said transaction request, said corresponding one of a plurality of prepaid card numbers including prepaid account information.

10. The system according to claim 1, wherein said prepaid card number is characterized by a predetermined monetary value.

11. The system according to claim 10, wherein said first country financial institution system is configured to compare said transaction request to said predetermined monetary value, and provide to said merchant system at least one of a transaction authorized message and transaction denied message, said transaction authorized message being provided where said transaction request is at least one of less than and equal to said predetermined monetary value, said transaction denied message being provided where said transaction request is more than said predetermined monetary value.

12. The system according to claim 1, wherein said first country financial institution system is characterized by a financial institution payment network system code associated with said first country, said financial institution payment network system code corresponding to said payment network authorization code.

13. The system according to claim 1, wherein said first country financial institution system is configured to provide a monetary amount to said merchant server in response to said transaction request.

14. The system according to claim 1, wherein said first country financial institution system is configured to provide said monetary amount in accordance with existing monetary exchange rates.

15. The system according to claim 1, wherein a unique prepaid card number is characterized by an expiration date wherein said unique prepaid card number corresponds to said account number, and said transaction request is characterized by a transaction request date.

16. The system according to claim 15, wherein said merchant system provides said transaction request date to said first country financial institution system.

17. The system according to claim 16, wherein said first country financial institution system is configured to compare said transaction request date to said expiration date, said merchant server further configured to return said transaction denied message where said transaction date occurs later in time than said expiration date.

18. The system according to claim 1, further including a sponsor configured to communicate with said first country financial institution system, wherein said prepaid card number is characterized by a predetermined monetary value, said sponsor configured to provide said predetermined monetary value to said first country financial institution for establishing a spending limit for said prepaid account, said spending limit corresponding to said predetermined monetary value, said predetermined monetary value provided in a currency capable of being processed by said second country financial institution system.

19. The system according to claim 18, wherein said first country financial institution system is configured to reload said spending limit in response to said predetermined monetary value.

20. The system according to claim 19, wherein said sponsor is configured to provide an updated expiration date to said first country financial institution system updated expiration date corresponding to at least one of said prepaid card number, said updated expiration date configured to replace said prepaid card expiration date correlating to said prepaid card account.

21. The system according to claim 20, wherein said first country financial institution system is configured to provide a portion of said predetermined monetary value to said sponsor at said expiration date, said portion of said predetermined value being provided in the currency of the country of at least one of said first country financial institution system and said sponsor.

22. A method for facilitating a prepaid card account maintained by a first country financial institution located in a first country, said prepaid card account used for effecting payment of at least one of goods and services in a second country, said method comprising:

receiving, at said first country financial institution, a second country payment network system code from a second country financial institution, said first country financial institution including a first country financial system server and first country financial institution database;

establishing a prepaid account on said first country financial institution database wherein said prepaid account is used in a second country, said prepaid account being characterized by an account number including a second country payment network system code formatted such that said second country payment network system code is capable of being processed by a second country payment network, wherein said second country payment network system code is not recognized by said first country financial institution and wherein said account number is received from a merchant system, which is located in said second country and includes a merchant server;

receiving said account number and a transaction request including said second country payment network authorization code at said first country financial institution, wherein said account number is received in accordance with at least one of said second country payment network system code and a routing code;

processing said account number and a transaction request to match said account number to said prepaid account and determine when said prepaid account has a sufficient balance in accordance with said transaction request, wherein said transaction request is related to a transaction using said prepaid card account;

authorizing the prepaid card account;

debiting the prepaid card account at said first country financial institution system;

transmitting an authorization to said second country payment network, wherein said second country payment network further transmits said authorization to said merchant system to facilitate the transaction; and, transmitting a settlement of the transaction to the merchant system from said first country financial institution.

23. The method according to claim 22, wherein said establishing a prepaid account further includes providing said first country financial institution with a predetermined monetary value corresponding to a spending limit of said prepaid account.

24. The method according to claim 22, wherein inputting said account number in said merchant system further includes providing said account number to at least one of a customer interface and merchant point of sale (POS) device.

25. The method according to claim 22, wherein matching said account number to said prepaid account includes correlating said account number to said prepaid account.

26. The method according to claim 22, wherein satisfying said transaction request includes the steps of comparing said transaction request to said predetermined monetary value, retrieving at least a portion of said predetermined monetary value, and forwarding said portion of said predetermined monetary value to said merchant system.

27. The method according to claim 26, wherein said forwarding said portion of said predetermined monetary value includes the step of converting said monetary value into a currency of a country in which said merchant system is located, said converting of said monetary value being done in accordance with established currency conversion tables.

28. The method according to claim 22, further including reloading at least a portion of said predetermined monetary value in response to a depleted funds condition.

29. The method according to claim 22, wherein said satisfying said transaction request includes providing to said merchant system at least one of a prepaid account balance of funds available, transaction history, and expiration date.

30. The method according to claim 22, further including updating a prepaid account expiration date.

31. The method according to claim 22, further including providing a portion of predetermined funds to at least one of a sponsor and a prepaid cardholder upon a prepaid account expiration date, said portion of predetermined funds being provided in said currency of a country in which at least one of said sponsor and said prepaid cardholder is located.

* * * * *

UNITED STATES PATENT AND TRADEMARK OFFICE
CERTIFICATE OF CORRECTION

PATENT NO.        : 7,401,049 B2                                           Page 1 of 1
APPLICATION NO.  : 10/155332
DATED             : July 15, 2008
INVENTOR(S)       : Chris Hobbs et al.

It is certified that error appears in the above-identified patent and that said Letters Patent is hereby corrected as shown below:

In Column 18, line 12, please delete "a".

Signed and Sealed this

Fourth Day of November, 2008

JON W. DUDAS
*Director of the United States Patent and Trademark Office*